US012559127B2

(12) United States Patent
Fujita et al.

(10) Patent No.: US 12,559,127 B2
(45) Date of Patent: Feb. 24, 2026

(54) VEHICLE NOTIFICATION SYSTEM

(71) Applicant: TOYOTA JIDOSHA KABUSHIKI KAISHA, Toyota (JP)

(72) Inventors: Koichi Fujita, Toyota (JP); Jun Tohyama, Nisshin (JP); Daisuke Akaho, Nagoya (JP); Yuta Maniwa, Susono (JP); Natsumi Izawa, Kariya (JP); Shunichiroh Sawai, Tokyo-to (JP); Masahiko Nakamura, Okazaki (JP); Kenichiro Aoki, Machida (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 18/610,532

(22) Filed: Mar. 20, 2024

(65) Prior Publication Data

US 2024/0367673 A1 Nov. 7, 2024

(30) Foreign Application Priority Data

May 1, 2023 (JP) ................................ 2023-075846

(51) Int. Cl.
| | |
|---|---|
| *B60W 50/16* | (2020.01) |
| *B60K 35/25* | (2024.01) |
| *B60K 35/28* | (2024.01) |
| *B60W 40/08* | (2012.01) |
| *B60W 50/14* | (2020.01) |
| (Continued) | |

(52) U.S. Cl.
CPC ............. *B60W 50/16* (2013.01); *B60K 35/25* (2024.01); *B60K 35/28* (2024.01); *B60W 40/08* (2013.01); *B60W 60/001* (2020.02);

*G06V 20/597* (2022.01); *B60K 2360/178* (2024.01); *B60K 2360/569* (2024.01);
(Continued)

(58) Field of Classification Search
CPC .... B60W 50/16; B60W 40/08; B60W 60/001; B60W 2040/0818; B60W 2050/143; B60W 2540/229; B60W 50/14; B60W 60/0053; B60K 35/25; B60K 35/28; B60K 2360/178; B60K 2360/569; G06V 20/597

See application file for complete search history.

(56) References Cited

U.S. PATENT DOCUMENTS

| | | | | |
|---|---|---|---|---|
| 9,637,169 B2 * | 5/2017 | Klank | .................... | B62D 1/046 |
| 2017/0369075 A1 * | 12/2017 | Hwang | ................. | B60W 50/14 |

(Continued)

FOREIGN PATENT DOCUMENTS

| | | |
|---|---|---|
| JP | 2017-157196 A | 9/2017 |
| JP | 2020-102252 A | 7/2020 |
| JP | 2021-142936 A | 9/2021 |

*Primary Examiner* — Daryl C Pope
(74) *Attorney, Agent, or Firm* — Oliff PLC

(57) ABSTRACT

A vehicle notification system according to a first aspect includes: a terminal installation portion that is provided at a periphery of a driver's seat of a vehicle capable of autonomous driving in which all driving operations are performed under certain conditions, and that is configured such that a portable terminal can be installed at the terminal installation portion; and a control section that is configured to permit the autonomous driving in a case in which a portable terminal is detected as being installed at the terminal installation portion, and is configured to notify the portable terminal in a case in which a predetermined condition in an autonomous driving state is satisfied.

5 Claims, 6 Drawing Sheets

(51) Int. Cl.
    _B60W 60/00_      (2020.01)
    _G06V 20/59_      (2022.01)

(52) U.S. Cl.
    CPC ............... _B60W 2040/0818_ (2013.01); _B60W_
                _2050/143_ (2013.01); _B60W 2540/229_
                           (2020.02)

(56)                References Cited

U.S. PATENT DOCUMENTS

| | | | |
|---|---|---|---|
| 2018/0026669 A1* | 1/2018 | Edwards | G08B 21/06 |
| | | | 455/418 |
| 2018/0345980 A1 | 12/2018 | Morita et al. | |
| 2020/0225054 A1* | 7/2020 | Ramtirth | A61B 5/0022 |
| 2023/0365161 A1* | 11/2023 | Lee | B60Q 1/507 |

* cited by examiner

VEHICLE NOTIFICATION SYSTEM

CROSS-REFERENCE TO RELATED APPLICATION

This application is based on and claims priority under 35 USC 119 from Japanese Patent Application No. 2023-075846 filed on May 1, 2023, the disclosure of which is incorporated by reference herein.

BACKGROUND

Technical Field

The present disclosure relates to a vehicle notification system.

Related Art

Japanese Patent Application Laid-Open (JP-A) No. 2020-102252 discloses a driver monitoring system that performs communication between a portable terminal and a vehicle control device to monitor a driver. The driver monitoring system of Laid-Open (JP-A) No. 2020-102252 determines whether or not a driver is looking at a display screen of a portable terminal based on an image captured by a camera of the portable terminal during travel of a host vehicle, and issues an alarm in a case in which it is determined that the driver is looking at the display screen of the portable terminal.

However, in the driver monitoring system described in Japanese Patent Application Laid-Open (JP-A) No. 2020-102252, in a case in which there are plural portable terminals inside the vehicle, the portable terminal of the driver cannot be specified. This causes warnings to be given with respect to all of the portable terminals, which is cumbersome.

SUMMARY

The present disclosure obtains a vehicle notification system capable of providing a predetermined notification only to a specific portable terminal in a vehicle that is capable of autonomous driving at a level of 3 or higher enabling all driving operations under certain conditions.

A vehicle notification system according to a first aspect includes: a terminal installation portion that is provided at a periphery of a driver's seat of a vehicle capable of autonomous driving in which all driving operations are performed under certain conditions, and that is configured such that a portable terminal can be installed at the terminal installation portion; and a control section that is configured to permit the autonomous driving in a case in which a portable terminal is detected as being installed at the terminal installation portion, and is configured to notify the portable terminal in a case in which a predetermined condition in an autonomous driving state is satisfied.

In the vehicle notification system according to the first aspect, a terminal installation portion is provided at the periphery of the driver's seat of a vehicle that is capable of performing all driving operations under certain conditions, and the terminal installation portion is configured such that a portable terminal can be installed at the terminal installation portion. Moreover, in a case in which a portable terminal is detected as being installed at the terminal installation portion, a control section is configured to permit autonomous driving, and is also configured to notify the portable terminal in a case in which a predetermined condition in an autonomous driving state is satisfied. This enables a notification to be performed only with respect to the portable terminal that is installed at the terminal installation portion even in a case in which plural portable terminals are present inside a vehicle cabin of the vehicle. Moreover, by not permitting autonomous driving until the portable terminal is installed at the terminal installation portion, a situation in which a notification target portable terminal is not present in the autonomous driving state can be avoided.

A vehicle notification system according to a second aspect is the vehicle notification system according to the first aspect, wherein the control section is configured to: acquire an image captured by a camera that is installed at the portable terminal; and permit the autonomous driving state to continue in a case in which a degree of arousal of an occupant, which is based on the acquired image, is greater than or equal to a predetermined level.

In the vehicle notification system according to the second aspect, since the degree of arousal of an occupant is determined based on an image that is captured by the camera installed at the portable terminal, the face of the occupant can be captured even in a case in which the occupant is looking down and operating the portable terminal in an autonomous driving state. Namely, as compared to a configuration using a camera that is installed at an instrument panel or the like of a vehicle, the face of an occupant can be efficiently captured.

A vehicle notification system according to a third aspect is the vehicle notification system according to the second aspect, wherein the control section is configured to provide a warning to the occupant in at least one of a case in which the degree of arousal of the occupant based on the image is less than the predetermined level or a case in which the degree of arousal of the occupant cannot be determined.

In the vehicle notification system according to the third aspect, it is possible to prepare for a switch to manual driving by providing a warning in a case in which the degree of arousal of the occupant is less than the predetermined level, that is, in a case in which the occupant is not able to perform driving in a normal manner. Similarly, warning is performed in a case in which the degree of arousal of the occupant cannot be determined, enabling the occupant to understand that the degree of arousal has not been able to be determined.

A vehicle notification system according to a fourth aspect is the vehicle notification system according to the first aspect, wherein the terminal installation portion is provided at at least one of an instrument panel of a front part inside a vehicle cabin of the vehicle or a steering wheel.

In the vehicle notification system according to the fourth aspect, the portable terminal can be installed at the instrument panel or at the steering wheel. This eliminates the need to prepare separate components in order to install the portable terminal. Moreover, as compared to a structure using a separate holder or the like, design characteristics can be improved.

A vehicle notification system according to a fifth aspect is the vehicle notification system according to any one of the first aspect to the fourth aspect, wherein the control section is configured to provide a warning in a case in which the detected portable terminal is separated from the driver's seat by a predetermined amount or more.

In the vehicle notification system according to the fifth aspect, by providing a warning in a case in which the portable terminal is separated from the driver's seat by a predetermined amount or more, the portable terminal for notifying a driver from the vehicle side can be constantly positioned at a periphery of the driver's seat.

The vehicle notification system according to the present disclosure enables a predetermined notification to be performed only with respect to a specific portable terminal in a vehicle that is capable of autonomous driving at a level of 3 or higher enabling all driving operations under certain conditions.

BRIEF DESCRIPTION OF THE DRAWINGS

An exemplary embodiment of the present disclosure will be described in detail based on the following figures, wherein.

DETAILED DESCRIPTION

Explanation follows regarding a vehicle notification system 10 according to an exemplary embodiment, with reference to the drawings. Note that the arrow UP illustrated in FIG. 1 indicates an upper side in a vehicle vertical direction, and the arrow RH indicates a right side in a vehicle width direction. The vertical direction and a left-right direction in the following explanation respectively mean up and down in the vehicle vertical direction and left and right in the vehicle width direction.

Figure 1:
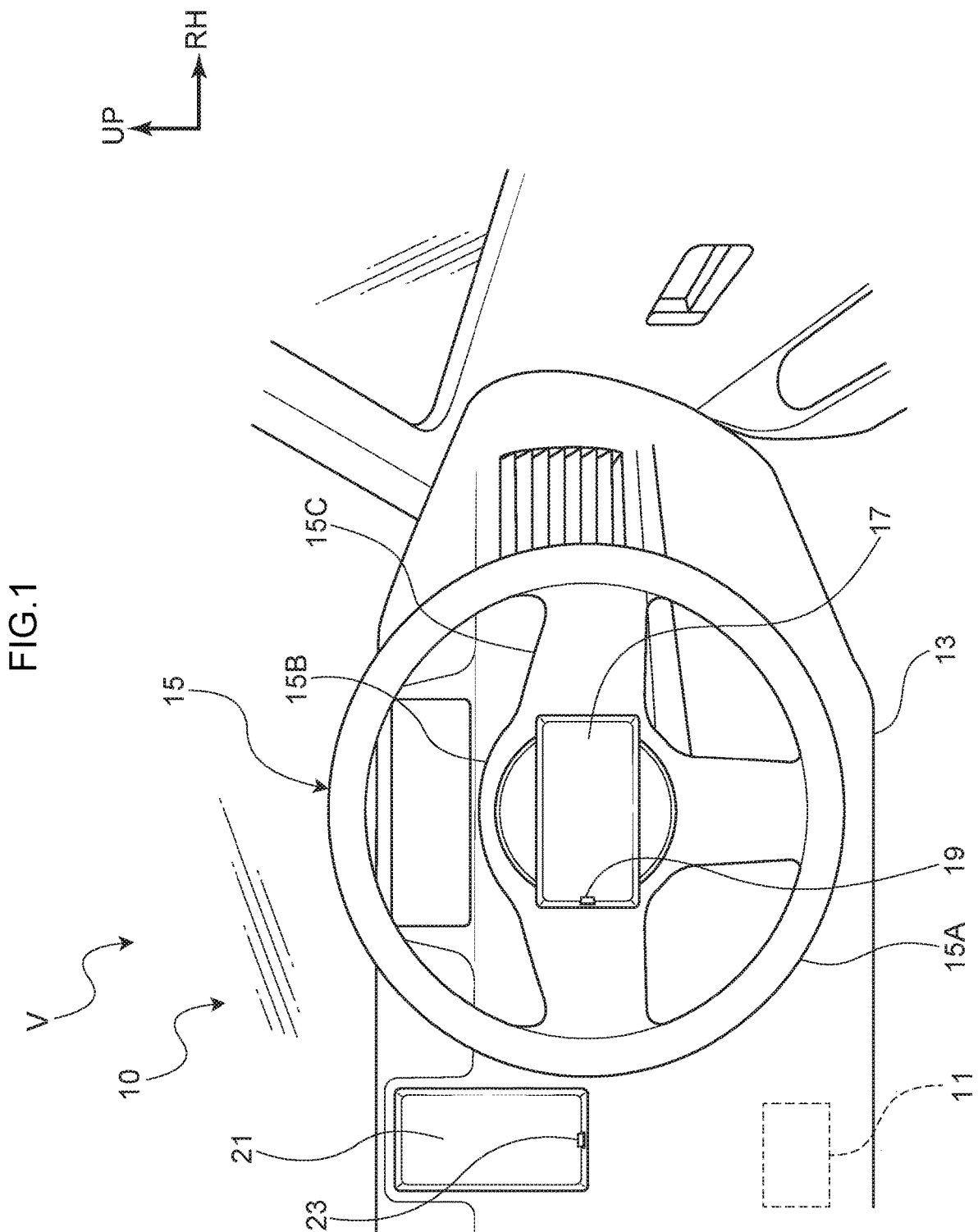
FIG. 1 is a diagram illustrating a front part inside a vehicle cabin of a vehicle to which a vehicle notification system according to an exemplary embodiment is applied.

As illustrated in FIG. 1, an instrument panel 13 is provided at a front part inside a vehicle cabin of a vehicle V. The instrument panel 13 extends in the vehicle width direction, and a steering wheel 15 is provided at a vehicle right side of the instrument panel 13. Namely, in the present exemplary embodiment, as an example, a right hand drive vehicle is configured with the steering wheel 15 provided on the right side, and a driver's seat is installed on the right side of the vehicle. Note that there is no limitation thereto, and the present disclosure may be applied to a vehicle in which the driver's seat is installed on the left side of the vehicle.

The steering wheel 15 includes a substantially annular rim portion 15A. Further, a hub portion 15B that configures a central portion is provided at an inner peripheral side of the rim portion 15A. The rim portion 15A and the hub portion 15B are connected by plural (three in the present exemplary embodiment) spoke portions 15C.

A first terminal installation portion 17 is provided at the hub portion 15B of the steering wheel 15. The first terminal installation portion 17 is formed in a shape in which part of the hub portion 15B is recessed in a substantially rectangular shape so as to correspond to the shape of a portable terminal, and is configured such that a portable terminal can be arranged at the first terminal installation portion 17. Moreover, as an example, in the present exemplary embodiment, a first connection terminal 19 is provided at the first terminal installation portion 17, and by the first connection terminal 19 being inserted into a non-illustrated connection port formed at a portable terminal, it is possible to electrically connect the vehicle V and the portable terminal.

A second terminal installation portion 21 is provided at a central portion of the instrument panel 13 in the vehicle width direction. The second terminal installation portion 21 is formed in a shape in which part of the instrument panel 13 is recessed in a substantially rectangular shape so as to correspond to the shape of a portable terminal, and is configured such that a portable terminal can be arranged at the second terminal installation portion 21. Note that it is more preferable that the second terminal installation portion 21 is oriented in a direction inclined upward further than a horizontal direction so that a camera of a portable terminal faces the face of a driver at a time at which a portable terminal is installed. More specifically, a bottom face of the recessed hollow of the second terminal installation portion 21 may be formed so as to gradually incline upward from a vehicle rear side toward a vehicle front side. Moreover, as an example, in the present exemplary embodiment, a second connection terminal 23 is provided at the second terminal installation portion 21, and by the second connection terminal 23 being inserted into a non-illustrated connection port formed at a portable terminal, it is possible to electrically connect the vehicle V and the portable terminal. The second terminal installation portion 21 may be configured to sandwich an installed portable terminal from side surfaces. The second terminal installation portion 21 has a function of elastically sandwiching a portable terminal, enabling a portable terminal to be installed regardless of the type of portable terminal having a different size.

Note that a configuration that enables non-contact electrical connection with a portable terminal, without providing the first connection terminal 19 or the second connection terminal 23, may be adopted. For example, a non-contact charging coil or the like may be provided at an inner side of the hub portion 15 or the instrument panel 13 so as to be electrically connected to a portable terminal. Alternatively, a near-field communication (NFC) tag or the like may be provided at the inner side of the hub portion 15 or the instrument panel 13.

The first terminal installation portion 17 and the second terminal installation portion 21 are configured such that it is possible to attach non-illustrated covers thereto when not in use. In a case in which a cover is attached to the steering wheel 15, the hub portion 15B and the cover are flush with each other, enabling deterioration in design characteristics to be suppressed. Similarly, in a case in which a cover is attached to the instrument panel 13, the instrument panel 13 and the cover are flush with each other, enabling deterioration in design characteristics to be suppressed.

Note that the vehicle V is provided with a control section 11 that configures the vehicle notification system 10. The control section 11 of the present exemplary embodiment is, for example, an electronic control unit (ECU) that performs various control.

Figure 2:
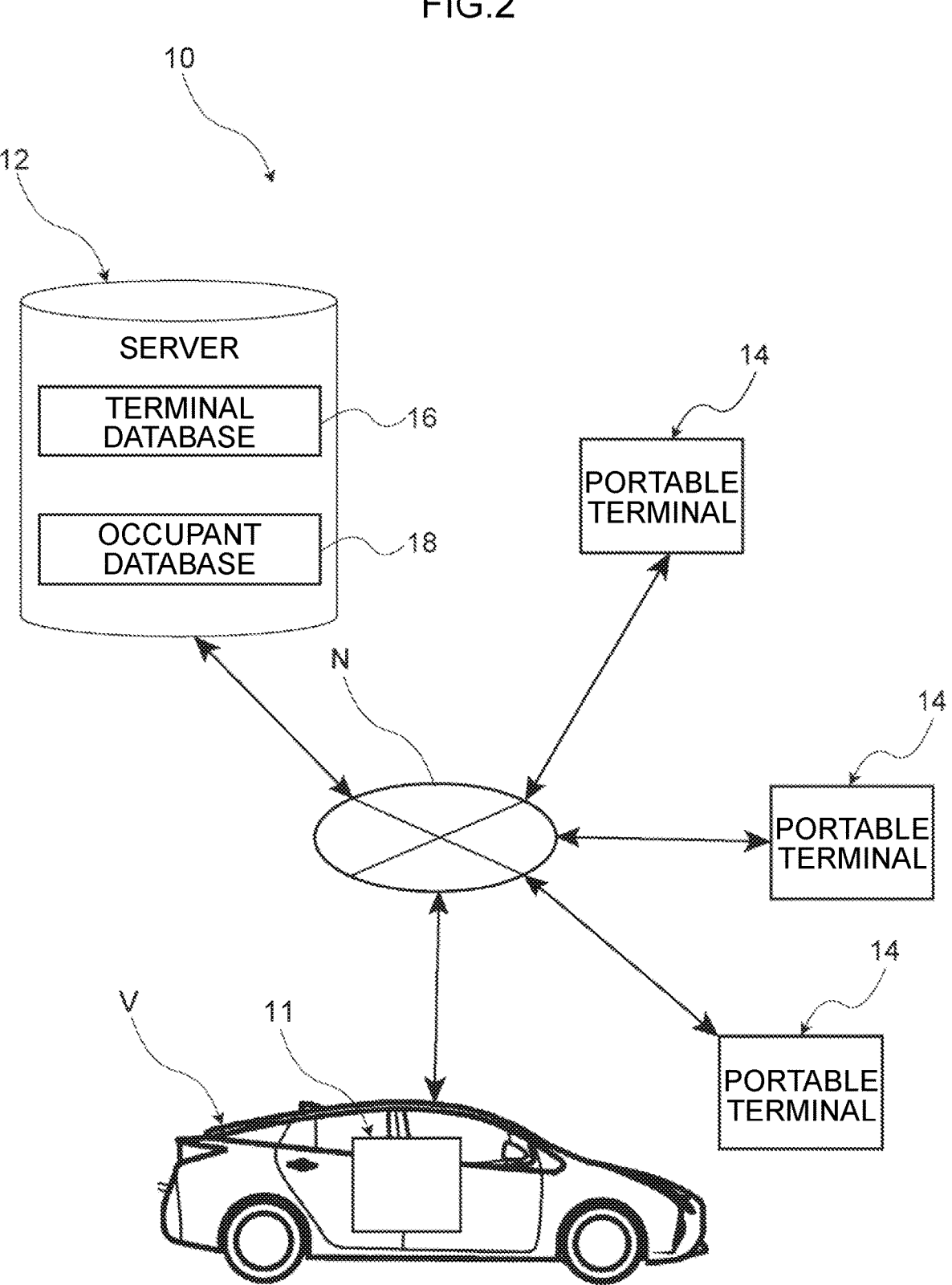
FIG. 2 is a schematic diagram illustrating a vehicle notification system according to an exemplary embodiment.

FIG. 2 is a schematic diagram illustrating the vehicle notification system according to an exemplary embodiment. As illustrated in FIG. 2, the vehicle notification system 10 according to the present exemplary embodiment includes the control section 11 and a server 12. The control section 11 and the server 12 are connected via a network N so as to be capable of communicating with each other. Moreover, plural portable terminals 14 are capable of communicating with the control section 11 via the network N.

The control section 11 is configured to perform information processing between the server 12 and the portable terminals 14. Note that the control section 11 may be provided outside the vehicle V. In this case, the control section 11 is configured to be capable of communicating with an onboard unit or the like installed at the vehicle V via the network N.

The vehicle V is configured so as to be capable of switching between autonomous driving and manual driving. Particularly, in the present exemplary embodiment, the vehicle V is capable of autonomous driving at a level of 3 or higher enabling all driving operations under certain conditions.

The server 12 stores various data. In the present exemplary embodiment, as an example, the server 12 includes a terminal database 16 and an occupant database 18. The terminal database 16 stores information relating to plural portable terminals 14 that may be brought into the vehicle V. For example, the terminal database 16 stores information such as an identification number of each portable terminal 14 and a notification application.

The occupant database 18 stores information relating to plural occupants who may board the vehicle V. For example, the occupant database 18 stores an identification number of each occupant, information on a portable terminal possessed by each occupant, information relating to the presence or absence of a driving license for each occupant, and biometric information of each occupant. The biometric information is information including at least one of information relating to a fingerprint, a voice print, an iris, or a face; however, there is no limitation thereto, and the biometric information may include information relating to a vein or the like.

The portable terminal 14 is a terminal that can be brought into the vehicle V by an occupant of the vehicle V, and includes a mobile phone, a smart phone, a tablet personal computer, a laptop personal computer, and the like. Note that although FIG. 2 illustrates three portable terminals 14, there is no limitation thereto, and four or more portable terminals 14 may be connected to the network N. Alternatively, two or less portable terminals 14 may be connected to the network N.

The vehicle notification system 10 of the present exemplary embodiment is configured as described above, and the control section 11 is configured to permit autonomous driving in a case in which a portable terminal 14 installed at the first terminal installation portion 17 or the second terminal installation portion 21 provided at the vehicle V is detected, and also perform notification to the portable terminal 14 in a case in which a predetermined condition in an autonomous driving state is satisfied.

Hardware Configuration of Vehicle V

Figure 3:
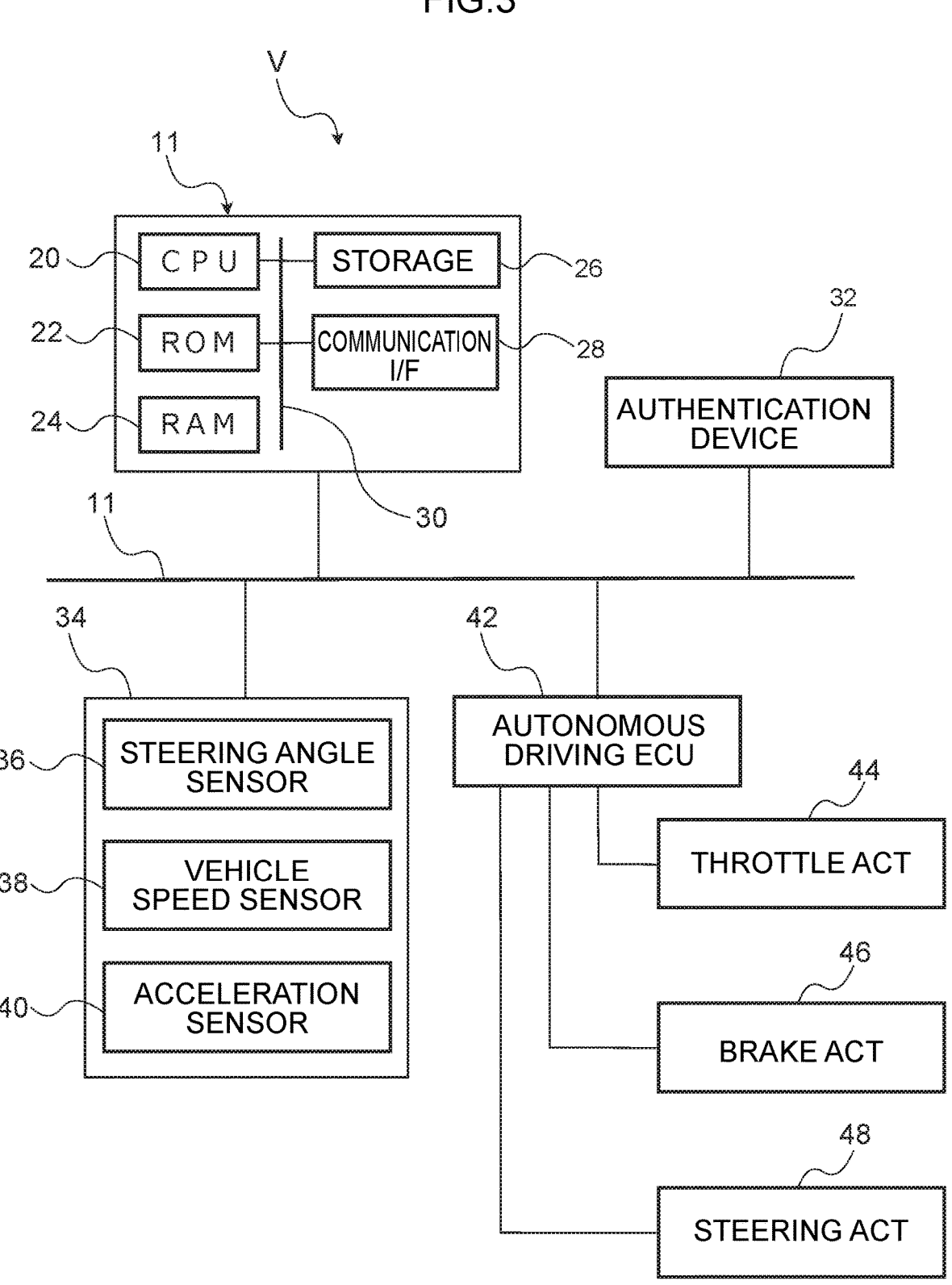
FIG. 3 is a block diagram illustrating an example of a hardware configuration of a vehicle in an exemplary embodiment.

FIG. 3 is a block diagram illustrating an example of a hardware configuration of the vehicle V in an exemplary embodiment. As illustrated in FIG. 3, the vehicle V is provided with a communication bus 11, and the communication bus 11 is electrically connected with the control section 11, an authentication device 32, a vehicle travel state detection sensor group 34, an autonomous driving ECU 42, non-illustrated peripheral situation acquisition devices, and the like.

The control section 11 includes a central processing unit (CPU; serving as a processor) 20, read only memory (ROM) 22, random access memory (RAM) 24, storage 26, and a communication interface (communication I/F) 28. These respective configurations are communicably connected to each other via an internal bus 30.

The CPU 20 is a central processing unit that executes various programs and controls various components. Namely, the CPU 20 reads a program from the ROM 22 or the storage 26, and executes the program using the RAM 24 as a workspace. Further, the CPU 20 controls the respective configurations described above and performs a variety of computation processing in accordance with programs stored in the ROM 22 or the storage 26.

The ROM 22 stores various programs and various data. The RAM 24 serves as a workspace to temporarily store programs and data. The storage 26 is configured by a hard disk drive (HDD) or a solid state drive (SSD), and is a non-transitory storage medium that stores various programs including an operating system, as well as various data. In the present exemplary embodiment, a program or the like for performing various processing is stored in the ROM 22 or the storage 26.

The communication I/F 28 is an interface for the control section 11 to communicate with the server 12, the portable terminal 14, and the like, and, for example, a protocol such as a controller area network (CAN), Ethernet (registered trademark), long term evolution (LTE), a fiber distributed data interface (FDDI), or Wi-Fi (registered trademark) is used.

The authentication device 32 is connected to the first terminal installation portion 17 and the second terminal installation portion 21, and performs authentication of the portable terminal 14 installed at the first terminal installation portion 17 or the second terminal installation portion 21. The authentication information authenticated by the authentication device 32 is transmitted to the control section 11.

The vehicle travel state detection sensor group 34 includes a steering angle sensor 36 that detects a steering angle of the vehicle V, a vehicle speed sensor 38 that detects a travel speed of the vehicle V, and an acceleration sensor 40 that detects acceleration applied to the vehicle V as sensors that acquire a travel state of the vehicle V.

The autonomous driving ECU 42 is electrically connected to a throttle ACT 44 that changes a throttle position of the vehicle V, a brake ACT 46 that changes a braking force, and a steering ACT 48 that changes a steering amount by a steering device. The autonomous driving ECU 42 is an ECU that performs autonomous driving processing to cause the vehicle V to travel automatically without accompanying driving operation by an occupant of the vehicle V. Particularly, in the present exemplary embodiment, the autonomous driving ECU 42 is configured to be capable of autonomous driving processing of level 3 or higher. During autonomous driving at a level 3 or higher, the driver is relieved from driving operation, and there is no need to pay attention to in front of the vehicle. This enables the driver to operate the portable terminal 14 during autonomous driving at a level 3 or higher.

The autonomous driving ECU 42 includes a central processing unit (CPU), read only memory (ROM), random access memory (RAM), or other memory, a non-volatile storage section such as a hard disk drive (HDD) or solid state drive (SSD), and a communication interface (I/F). The storage section stores autonomous driving software.

Although not illustrated in the drawings, the vehicle V includes a peripheral situation acquisition device, and the peripheral situation acquisition device is electrically connected to the communication bus 11. The peripheral situation acquisition device is a group of sensors that acquire peripheral information for the vehicle V at a time at which the vehicle V performs autonomous driving processing, and includes, for example, a global navigation satellite system (GNSS) device, an onboard communication device, a navigation system, a radar device, peripheral cameras, and the like.

The GNSS device receives GNSS signals from plural GNSS satellites to measure a position of the vehicle V. The onboard communication device is a communication device that performs at least one of vehicle-to-vehicle communication with another vehicle or road-to-vehicle communication with a roadside unit. The navigation system includes a map information storage section that stores map information, and displays the position of the vehicle V on a map based on the position information acquired from the GNSS device and the map information stored in the map information storage section. The radar device detects an object, such as a pedestrian or another vehicle, present at a periphery of the vehicle V as point cloud information, and acquires the relative position and the relative speed of the detected object and the vehicle V. Moreover, based on changes in relative positions, relative speeds, and the like of individual objects included in the most recent plural detection results, the radar device excludes roadside objects such as noise, guard rails, and the like from monitoring targets, and follows and monitors specific objects such as pedestrians, other vehicles, and the like as monitoring target objects. The peripheral cameras capture the surroundings of the vehicle V with plural cameras, and output the captured images.

Hardware Configuration of the Portable Terminal 14

Figure 4:
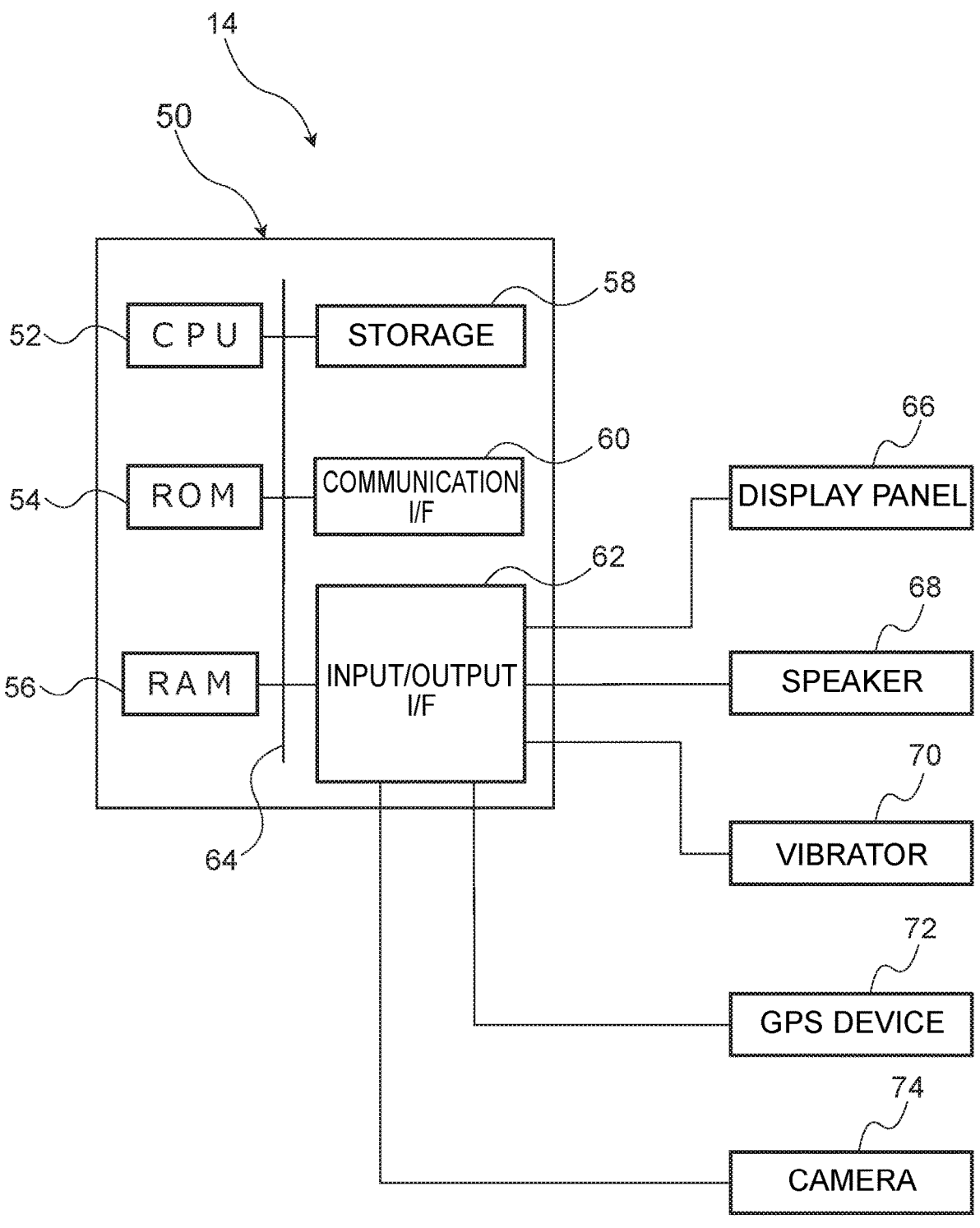
FIG. 4 is a block diagram illustrating an example of a hardware configuration of a portable terminal in an exemplary embodiment.

FIG. 4 is a block diagram illustrating an example of a hardware configuration of a portable terminal according to an exemplary embodiment. As illustrated in FIG. 4, each portable terminal 14 includes a CPU 52, ROM 54, RAM 56, storage 58, a communication interface (communication I/F) 60, and an input/output interface (input/output I/F) 62. These respective configurations are communicably connected to each other via an internal bus 64.

The CPU 52 is a central processing unit that executes various programs and controls various components. Namely, the CPU 52 reads a program from the ROM 54 or the storage 58, and executes the program using the RAM 56 as a workspace. Further, the CPU 52 controls the respective configurations described above and performs a variety of computation processing in accordance with programs stored in the ROM 54 or the storage 58.

The ROM 54 stores various programs and various data. The RAM 56 serves as a workspace to temporarily store programs and data. The storage 58 is configured by a hard disk drive (HDD) or a solid state drive (SSD), and is a non-transitory storage medium that stores various programs including an operating system, as well as various data. In the present exemplary embodiment, a program or the like for performing various processing is stored in the ROM 54 or the storage 58.

The communication I/F 60 is an interface for the portable terminal 14 to communicate with the control section 11 or the like, and, for example, a protocol such as Ethernet (registered trademark), long term evolution (LTE), a fiber distributed data interface (FDDI), Wi-Fi (registered trademark), Bluetooth (registered trademark), or near-field communication (NFC) is used.

The input/output I/F 62 is electrically connected to a display panel 66, a speaker 68, a vibrator 70, a GPS device 72, and a camera 74. The display panel 66 displays predetermined information. The speaker 68 is configured to be capable of outputting sound. The vibrator 70 vibrates in a case in which a predetermined signal is received. The GPS device 72 receives GPS signals from a GPS satellite to measure a position of the portable terminal 14. The camera 74 is configured so as to be capable of capturing an image of a periphery of the portable terminal 14.

Functional Configuration of the Control Section 11

The control section 11 of the vehicle notification system 10 implements various functions using the above-described hardware resources. Explanation follows regarding functional configurations implemented by the vehicle notification system 10, with reference to FIG. 5.

Figure 5:
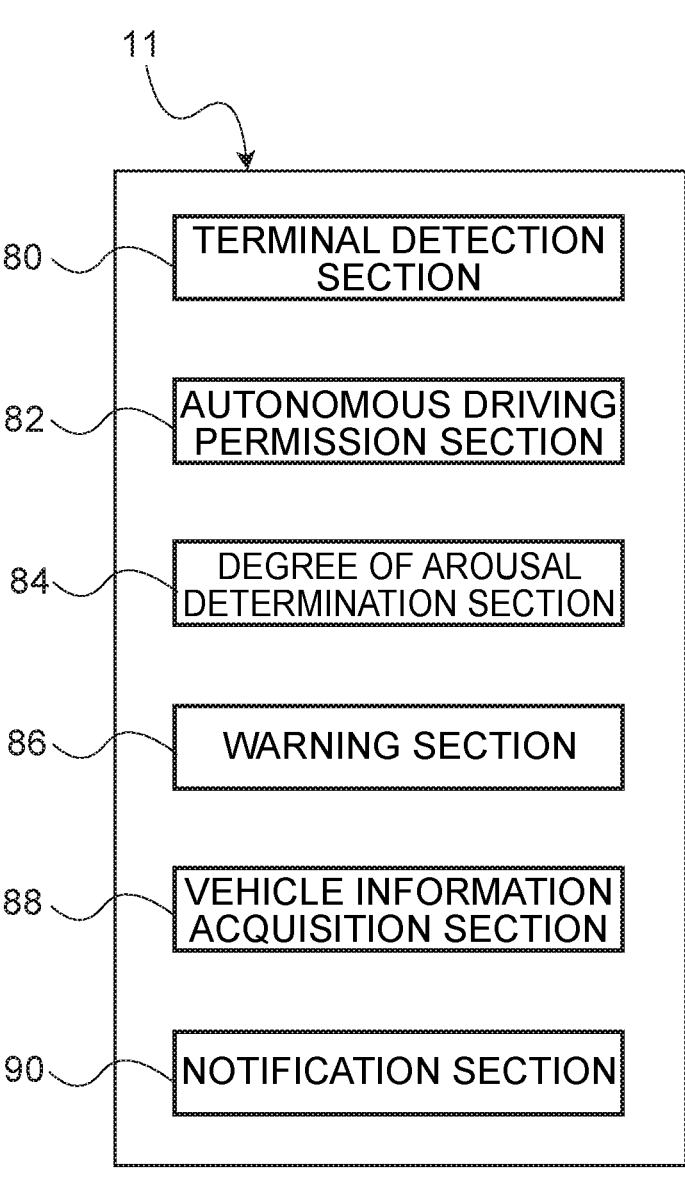
FIG. 5 is a block diagram illustrating an example of a functional configuration of a control section in an exemplary embodiment.

As illustrated in FIG. 5, the functional configuration of the control section 11 includes a terminal detection section 80, an autonomous driving permission section 82, a degree of arousal determination section 84, a warning section 86, a vehicle information acquisition section 88, and a notification section 90. Note that the respective functional configurations are implemented by the CPU 20 reading and executing programs stored in the ROM 22 or the storage 26.

The terminal detection section 80 detects the portable terminal 14 installed at the first terminal installation portion 17 or the second terminal installation portion 21. In a case in which a portable terminal 14 is installed at both the first terminal installation portion 17 and the second terminal installation portion 21, the terminal detection section 80 preferentially detects the portable terminal 14 installed at the first terminal installation portion 17.

Note that in the present exemplary embodiment, as an example, detection of the portable terminal 14 by the terminal detection section 80 is performed by the portable terminal 14 receiving a signal connected to the first connection terminal 19 or the second connection terminal 23. More specifically, in a case in which the first connection terminal 19 and the portable terminal 14 are connected to each other, the terminal detection section 80 detects the portable terminal 14. Moreover, in a case in which the first connection terminal 19 and the portable terminal 14 are not connected to each other, but the second connection terminal 21 and the portable terminal 14 are connected to each other, the terminal detection section 80 detects the portable terminal 14. The data relating to the detected portable terminal 14 is stored at the terminal database 16. Alternatively, the occupant database 18 may be queried to acquire data of an occupant who possesses the detected portable terminal 14.

As an example, in the present exemplary embodiment, after detection of the portable terminal 14 by the terminal detection section 80 has been completed, even if an occupant removes the portable terminal 14 from the terminal installation portion, the state in which the control section 11 and the portable terminal 14 are electrically connected is maintained. For example, the control section 11 is configured so as to be capable of performing a predetermined notification to the portable terminal 14 even in a case in which an occupant has removed the portable terminal 14 from the first terminal installation portion 17.

The autonomous driving permission section 82 permits autonomous driving of the vehicle V in a case in which the portable terminal 14 has been detected by the terminal detection section 80. More specifically, the autonomous driving permission section 82 permits autonomous driving processing of level 3 or higher by the autonomous driving ECU 42.

The degree of arousal determination section 84 determines a degree of arousal of an occupant (driver) that is seated at the driver's seat. More specifically, the degree of arousal determination section 84 acquires an image that is captured by the camera 74 installed at the portable terminal 14, and based on the acquired image, determines the degree of arousal of the occupant. Note that in the present exemplary embodiment, as an example, a camera 74 is provided on each side of the portable terminal 14, and in a case in which the face of the occupant cannot be detected based on the image captured by the camera 74 provided on one side of the portable terminal 14, the face of the occupant is detected based on the image captured by the camera 74 provided on the other side of the portable terminal 14.

The warning section 86 provides a warning to an occupant in at least one of a case in which the degree of arousal of the occupant determined by the degree of arousal determination section 84 is less than a predetermined level or in a case in which the degree of arousal of the occupant cannot be determined. The term "predetermined level" as used herein refers to a level at which driving of the vehicle V is hindered. Alternatively, for example, a method in which the vibrator 70 that is installed at the portable terminal 14 is activated and a warning sound is emitted from the speaker 68 may be used as a warning to an occupant. As another method, an occupant may be provided with a warning using a speaker or the like that is installed at the vehicle V. Note that in a case in which the degree of arousal of an occupant determined by the degree of arousal determination section 84 is greater than or equal to the predetermined level, the autonomous driving state is permitted to continue, and no warning is performed.

As an example, in the present exemplary embodiment, the warning section 86 is configured to provide a warning in a case in which the detected portable terminal 14 is separated from the driver's seat by a predetermined amount or more. More specifically, based on a signal from the GPS device 72 that is installed at the portable terminal 14, in a case in which the portable terminal 14 is located at a rear seat, the warning section 86 provides a warning to an occupant. Moreover, in a case in which the portable terminal 14 and the vehicle V are connected by Bluetooth, the precise position of the portable terminal 14 can be understood, and therefore, in a case in which it is detected that the portable terminal 14 is separated from the driver's seat, the warning section 86 may perform a warning to an occupant.

The vehicle information acquisition section 88 acquires information such as a travel state of the vehicle V. For example, the vehicle information acquisition section 88 acquires that the vehicle V is in an autonomous driving state (an autonomous driving state in which all driving operations are performed by the vehicle) of level 3 or higher.

The notification section 90 notifies the driver's terminal in a case in which the state of the vehicle V acquired by the vehicle information acquisition section 88 satisfies a predetermined condition. For example, the notification section 90 notifies the driver's terminal at a time at which the distance or the period of time required for the vehicle V to transition from the autonomous driving state of level 3 to the autonomous driving state of level 2 is less than a predetermined value. Moreover, for example, the notification section 90 notifies the driver's terminal at a time at which the distance or the period of time required for the vehicle V to transition from the autonomous driving state of level 3 to manual driving is less than a predetermined value.

Moreover, the notification section 90 may notify the driver's terminal at a time at which the vehicle V is in the autonomous driving state of level 3 and makes a proposal to change lane, to change route, to overtake or the like. Alternatively, the notification section 90 may notify the driver's terminal in a case in which the amount of fuel in the vehicle V becomes low or in a case in which the remaining battery capacity of the vehicle V becomes low. Moreover, the notification section 90 may notify the driver's terminal at a time at which the system transitions to a state of a minimum risk maneuver (MRM), which is motion control of the vehicle V until reaching a minimum risk condition (MRC).

Operation

Next, explanation follows regarding operation of the present exemplary embodiment.

Figure 6:
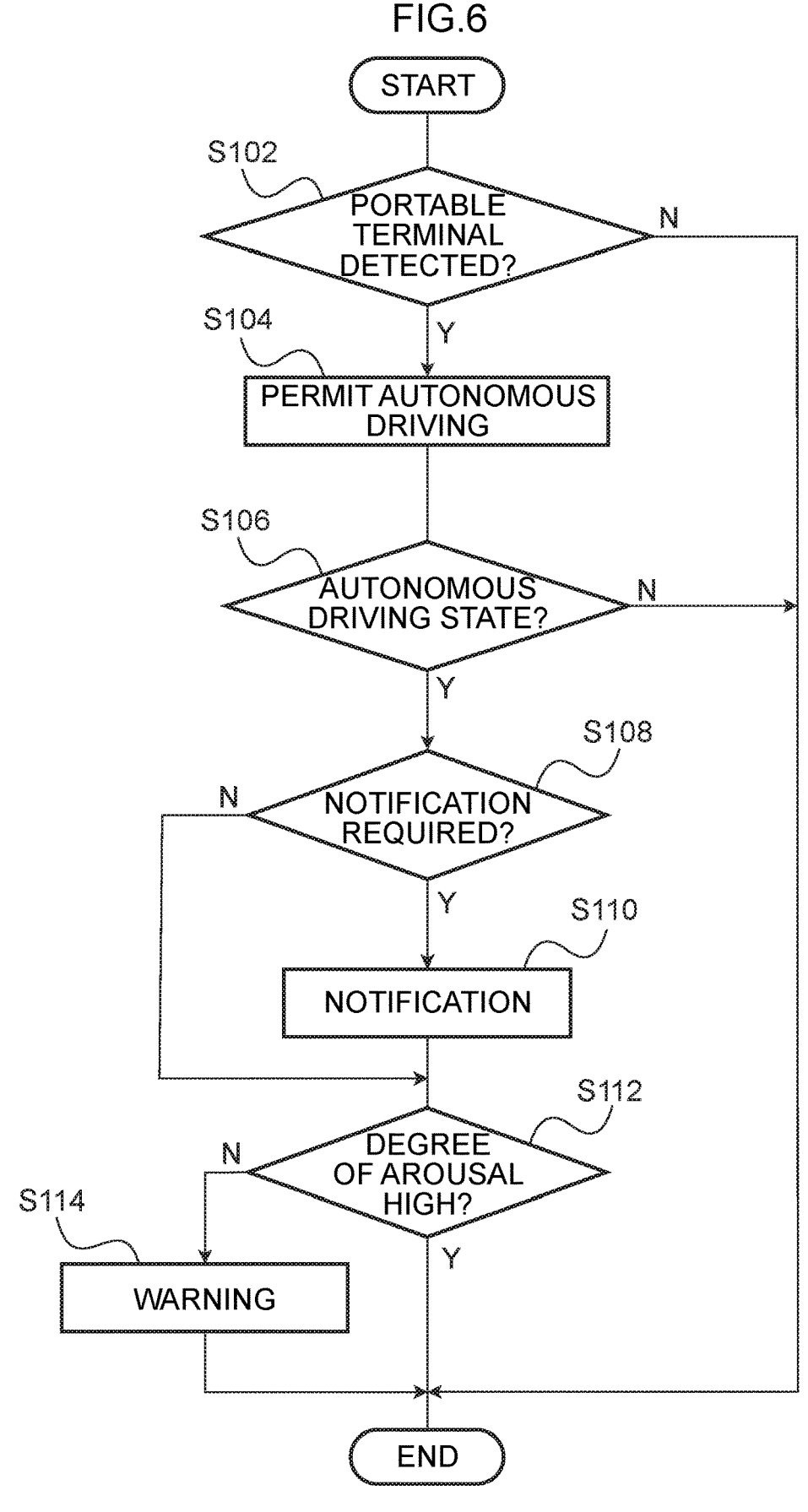
FIG. 6 is a flowchart illustrating an example of a flow of notification processing in an exemplary embodiment.

Explanation follows regarding an example of notification processing performed by the vehicle notification system 10 of the present exemplary embodiment, with reference to the flowchart illustrated in FIG. 6. The notification processing is executed by the CPU 20 reading a notification program from the ROM 22 or the storage 26, and loading and executing the notification program in the RAM 24. Note that as an example, the following notification processing is started at a time at which the vehicle V is started.

Example of Notification Processing

The CPU 20 determines whether or not a portable terminal has been detected at step S102. More specifically, using the functionality of the terminal detection section 80, in a case in which the portable terminal 14 is connected to the first connection terminal 19 of the first terminal installation portion 17, the CPU 20 determines that the portable terminal 14 has been detected. Moreover, using the functionality of the terminal detection section 80, in a case in which the portable terminal 14 is connected to the second connection terminal 23 of the second terminal installation portion 21, the CPU 20 determines that the portable terminal 14 has been detected. Note that in a case in which a portable terminal 14 is installed at both the first terminal installation portion 17 and the second terminal installation portion 21, the terminal detection section 80 preferentially detects the portable terminal 14 that is installed at the first terminal installation portion 17. In a case in which the CPU 20 determines that the portable terminal 14 has been detected, the processing transitions to step S104. Moreover, in a case in which the CPU 20 determines that the portable terminal 14 has not been detected, the present notification processing is ended without permitting autonomous driving.

At step S104, the CPU 20 permits autonomous driving of the vehicle V. More specifically, using the functionality of the autonomous driving permitting section 82, the CPU 20 permits autonomous driving processing of level 3 or higher by the autonomous driving ECU 42.

At step S106, the CPU 20 determines whether or not the vehicle V is in an autonomous driving state. More specifically, in a case in which autonomous driving of level 3 or higher of the vehicle V has started, based on a signal from the autonomous driving ECU 42, the CPU 20 determines that the vehicle V is in an autonomous driving state, and transitions to the processing of step S108. On the other hand, in a case in which the CPU 20 determines at step S106 that the vehicle V is not in an autonomous driving state, since there is no need to notify an occupant, the present notification processing is ended.

At step S108, the CPU 20 determines whether or not a notification is required. More specifically, the CPU 20 acquires the state of the vehicle V, and, for example, in a case in which the distance or the period of time required for the vehicle V to transition from an autonomous driving state of level 3 to an autonomous driving state of level 2 has become less than a predetermined value, determines whether or not it is a situation in which notification to an occupant is required. In a case in which it is determined that notification to an occupant is required, the CPU 20 transitions to the processing of step S110, and performs a predetermined notification to an occupant using the functionality of the notification section 90.

On the other hand, in a case in which the CPU 20 determines at step S108 that notification is not required, the processing transitions to step S112 without performing the processing at step S110.

At step S112, the CPU 20 determines whether or not the degree of arousal of an occupant is high. More specifically, using the functionality of the degree of arousal determination section 84, the CPU 20 acquires an image that is captured by the camera 74 installed at the portable terminal 14, and based on the acquired image, determines the degree of arousal of an occupant. In a case in which the CPU 20 determines at step S112 that the degree of arousal of an occupant is greater than or equal to the predetermined level, since there is no need to provide a warning to the occupant, the CPU 20 ends the present notification processing while maintaining the autonomous driving state.

On the other hand, in a case in which the CPU 20 determines at step S112 that the degree of arousal of an occupant is less than the predetermined level, the processing transitions to step S114, and the CPU provides a warning to the occupant. More specifically, the CPU 20 performs a warning to the occupant in a predetermined manner using the functionality of the warning section 86. For example, the CPU 20 may use a method in which the vibrator 70 installed in the portable terminal 14 is activated and a warning sound is emitted from the speaker 68. Further, as another method, the CPU 20 may provide a warning to an occupant using a speaker or the like that is installed at the vehicle V.

As described above, according to the vehicle notification system 10 of the present exemplary embodiment, as illustrated in FIG. 1, the first terminal installation portion 17 and the second terminal installation portion 21 are provided at a periphery of the driver's seat of the vehicle V that is capable of performing all driving operations under certain conditions, and the terminal installation portions are configured such that a portable terminal can be installed at the terminal installation portions. Moreover, in a case in which the control section 11 has detected a portable terminal 14 installed at at least one of the first terminal installation portion 17 or the second terminal installation portion 21, the control section 11 permits autonomous driving, and also notifies the portable terminal 14 in a case in which a predetermined condition in the autonomous driving state is satisfied. This enables a notification to be performed only with respect to a portable terminal 14 installed at at least one of the first terminal installation portion 17 or the second terminal installation portion 21, even in a case in which plural portable terminals are present inside the vehicle cabin. Moreover, by not permitting autonomous driving until the portable terminal 14 is installed at the first terminal installation portion 17 or the second terminal installation portion 21, a situation in which a notification target portable terminal is not present in an autonomous driving state can be avoided.

Moreover, in the present exemplary embodiment, since the degree of arousal of an occupant is determined based on an image captured by the camera 74 that is installed at the portable terminal 14, the face of the occupant can be captured even in a case in which the occupant is looking down and operating the portable terminal 14 in an autonomous driving state. Namely, as compared to a configuration using a camera installed at the instrument panel 13 or the like of the vehicle V, the face of an occupant can be efficiently captured.

Moreover, in the present exemplary embodiment, a warning is performed in a case in which the degree of arousal of an occupant is less than a predetermined level, namely in a case in which the occupant is not able to perform normal driving, enabling switching to manual driving to be performed. Similarly, warning is performed in a case in which the degree of arousal of the occupant cannot be determined, enabling the occupant to understand that the degree of arousal has not been able to be determined.

Moreover, in the present exemplary embodiment, a portable terminal can be installed at at least one of the instrument panel 13 or the steering wheel 15. This eliminates the need to prepare separate components in order to install the portable terminal 14. Moreover, the first terminal installation portion 17 is integrally provided at the steering wheel 15, and the second terminal installation portion 21 is integrally provided at the instrument panel 13. This enables the design characteristics to be improved in comparison to structures using separate holders and the like.

Moreover, in the present exemplary embodiment, by performing a warning in a case in which the portable terminal 14 is separated from the driver's seat by a predetermined amount or more, the portable terminal for notifying the driver from the vehicle side can be constantly positioned at a periphery of the driver's seat.

Although explanation has been given regarding the vehicle notification system 10 according to an exemplary embodiment, obviously various embodiments may be implemented within a range not departing from the gist of the present disclosure. In the above-described exemplary embodiment, as illustrated in FIG. 1, the first terminal installation portion 17 is configured in a horizontally long substantially rectangular shape; however, there is no limitation thereto, and the first terminal installation portion 17 may be formed in a vertically long substantially rectangular shape. Alternatively, the angle of the first terminal installation portion 17 may be changed by the operation of an occupant. For example, if the mounting seat of the first terminal installation portion 17 is configured so as to be rotatable with respect to the main body of the steering wheel 15, an occupant can change the angle to an arbitrary angle in a state in which the portable terminal 14 is installed at the first terminal installation portion 17.

Further, although explanation has been given regarding a structure in which the first terminal installation portion 17 is provided at the steering wheel 15 and the second terminal installation portion 21 is provided at the instrument panel 13 in the present exemplary embodiment, there is no limitation thereto, and a terminal installation portion may be provided at another location. For example, a terminal installation portion may be provided at an armrest of the driver's seat or at a center console between the driver's seat and the front passenger seat. Alternatively, in a structure including a collapsible sun visor at an upper portion of the driver's seat, a terminal installation portion may be provided at the sun visor. This enables the portable terminal 14 to be installed at a height of the line of sight of an occupant.

Moreover, in the present exemplary embodiment, although the warning section 86 illustrated in FIG. 5 is configured to perform a warning in a case in which the detected portable terminal 14 is separated from the driver's seat by a predetermined amount or more, there is no limitation thereto. For example, a configuration may be adopted in which a warning is performed in a case in which the portable terminal 14 is removed from the terminal installation portion. In this case, an occupant is required to operate the portable terminal 14 in a state in which the portable terminal 14 is installed at the terminal installation portion, enabling the portable terminal 14 to be reliably suppressed from being separated from the driver's seat.

Moreover, in the exemplary embodiment described above, the CPU 20 has started the processing illustrated in FIG. 6 at a time at which the vehicle V is started; however, the timing at which the CPU 20 starts this processing is not limited thereto. For example, when the vehicle V starts from a stationary state, the CPU 20 may perform the series of processing illustrated in FIG. 6 in order to perform setting of the driver's terminal. More specifically, when the shift position of the vehicle V is switched from parking to drive or reverse, the CPU 20 may perform the series of processing illustrated in FIG. 6. Moreover, when transitioning to an autonomous driving state, the CPU 20 may perform the series of processing illustrated in FIG. 6 to detect the portable terminal 14.

Further, in the above-described exemplary embodiment, any of various types of processors other than the CPU 20 may execute the processing that the CPU 20 executes by reading a program. Examples of such processors include a Programmable Logic Device (PLD) in which the circuit configuration can be modified post-manufacture, such as a Field-Programmable Gate Array (FPGA), or a specialized electric circuit that is a processor with a specifically-designed circuit configuration for executing specific processing, such as an Application Specific Integrated Circuit (ASIC). Further, the above-described processing may be executed by one of these various types of processors, or may be executed by combining two or more of the same type or different types of processors, for example, the above-described processing may be executed by plural FPGAs, or a combination of a CPU and an FPGA, or the like. Moreover, a hardware configuration of the various processors is specifically formed as an electric circuit combining circuit elements such as semiconductor elements.

In addition, although various data is stored in the storage 26 in the above-described exemplary embodiment, there is no limitation thereto. For example, a non-transitory recording medium such as a compact disc (CD), a digital versatile disc (DVD), or universal serial bus (USB) memory may act as a storage section. In this case, various programs, data, and the like are stored in these storage media.

Moreover, the flow of processing described in the above-described exemplary embodiment is an example, and unnecessary steps may be deleted, new steps may be added, or the processing order may be rearranged within a range not departing from the gist of the present disclosure. For example, in the notification processing illustrated in FIG. 6, the CPU 20 may perform the processing of step S102 after the processing of step S106. In this case, in a case in which a notification is required when the portable terminal 14 has not been detected, the CPU 20 may notify the display or the like installed at the vehicle V without notifying the driver's terminal.

The following supplementary notes are further disclosed regarding the above-described exemplary embodiment.

Supplementary Note 1

A vehicle notification system includes: a terminal installation portion that is provided at a periphery of a driver's seat of a vehicle capable of autonomous driving in which all driving operations are performed under certain conditions, and that is configured such that a portable terminal can be installed at the terminal installation portion; and a control section that is configured to permit the autonomous driving in a case in which a portable terminal is detected as being installed at the terminal installation portion, and is configured to notify the portable terminal in a case in which a predetermined condition in an autonomous driving state is satisfied.

Supplementary Note 2

The vehicle notification system according to supplementary note 1, wherein the control section is configured to: acquire an image captured by a camera that is installed at the portable terminal; and permit the autonomous driving state to continue in a case in which a degree of arousal of an occupant, which is based on the acquired image, is greater than or equal to a predetermined level.

Supplementary Note 3

The vehicle notification system according to supplementary note 2, wherein the control section is configured to provide a warning to the occupant in at least one of a case in which the degree of arousal of the occupant based on the image is less than the predetermined level or a case in which the degree of arousal of the occupant cannot be determined.

Supplementary Note 4

The vehicle notification system according to any one of supplementary note 1 to supplementary note 3, wherein the terminal installation portion is provided at at least one of an instrument panel of a front part inside a vehicle cabin of the vehicle or a steering wheel.

Supplementary Note 5

The vehicle notification system according to any one of supplementary note 1 to supplementary note 4, wherein the control section is configured to provide a warning in a case in which the detected portable terminal is separated from the driver's seat by a predetermined amount or more.

What is claimed is:

1. A vehicle notification system, comprising:
a terminal installation portion that is provided at a steering wheel and on a periphery of a driver's seat of a vehicle capable of autonomous driving in which all driving operations are performed under certain conditions, and that is configured such that a portable terminal can be installed at the terminal installation portion; and
a control section that is configured to permit the autonomous driving in response to detection of a portable terminal being installed at the terminal installation portion, and is configured to notify the portable terminal in a case in which a predetermined condition in an autonomous driving state is satisfied.

2. The vehicle notification system according to claim 1, wherein the control section is configured to:
acquire an image captured by a camera that is installed at the portable terminal; and
permit the autonomous driving state to continue in a case in which a degree of arousal of an occupant, which is based on the acquired image, is greater than or equal to a predetermined level.

3. The vehicle notification system according to claim 2, wherein the control section is configured to provide a warning to the occupant in at least one of a case in which the degree of arousal of the occupant based on the image is less than the predetermined level or a case in which the degree of arousal of the occupant cannot be determined.

4. The vehicle notification system according to claim 1, wherein the control section is configured to provide a warning in a case in which the detected portable terminal is separated from the steering wheel by a predetermined amount or more.

5. The vehicle notification system according to claim 4, wherein the control section is further configured to maintain wireless communication with the portable terminal in response to the detected separation of the portable terminal from the terminal installation portion.

* * * * *